United States Patent
Li et al.

(10) Patent No.: US 9,983,383 B2
(45) Date of Patent: May 29, 2018

(54) INFRARED LARGE-FORMAT TELECENTRIC LASER MARKING F THETA LENS

(71) Applicants: HAN'S LASER TECHNOLOGY CO., LTD, Guangdong (CN); HAN'S CNC SCIENCE AND TECHNOLOGY CO., LTD, Guangdong (CN)

(72) Inventors: Jiaying Li, Guangdong (CN); Chaoming Zhou, Guangdong (CN); Bo Sun, Guangdong (CN); Hi Huang, Guangdong (CN); Yunfeng Gao, Guangdong (CN)

(73) Assignees: HAN'S LASER TECHNOLOGY INDUSTRY GROUP CO., LTD., Shenzhen, Guangdong (CN); HAN'S CNC SCIENCE AND TECHNOLOGY CO., LTD, Shenzhen, Guangdong (CN)

( * ) Notice: Subject to any disclaimer, the term of this patent is extended or adjusted under 35 U.S.C. 154(b) by 146 days.

(21) Appl. No.: 14/913,202

(22) PCT Filed: Aug. 22, 2013

(86) PCT No.: PCT/CN2013/082064
§ 371 (c)(1),
(2) Date: Feb. 19, 2016

(87) PCT Pub. No.: WO2015/024233
PCT Pub. Date: Feb. 26, 2015

(65) Prior Publication Data
US 2016/0209625 A1    Jul. 21, 2016

(51) Int. Cl.
*G02B 13/00* (2006.01)
*G02B 9/12* (2006.01)
(Continued)

(52) U.S. Cl.
CPC .......... *G02B 13/0005* (2013.01); *G02B 9/12* (2013.01); *G02B 9/34* (2013.01); *G02B 13/14* (2013.01);
(Continued)

(58) Field of Classification Search
CPC .... G02B 13/0005; G02B 13/14; G02B 13/22; G02B 9/12; G02B 9/34; G02B 27/0025; G02B 27/0031
See application file for complete search history.

(56) References Cited

U.S. PATENT DOCUMENTS 5,867,299 A    2/1999  Takano et al.
6,324,015 B1 * 11/2001 Fuse .................. B23K 26/0643
                                                    359/206.1
(Continued)

FOREIGN PATENT DOCUMENTS

CN    1177114 A    3/1998
CN    101369046 A   2/2009
(Continued)

OTHER PUBLICATIONS

Office Action dated Apr. 19, 2017 issued in corresponding Chinese Patent Application.
(Continued)

*Primary Examiner* — Stephone B Allen
*Assistant Examiner* — Adam W Booher
(74) *Attorney, Agent, or Firm* — Polsinelli PC

(57) ABSTRACT

An Fθ lens for infrared large-format telecentric laser marking is disclosed, including a first lens element, a second lens element, a third lens element and a fourth lens element arranged sequentially along the propagation direction of an incident ray. The first lens element is a negative biconcave lens element including a first curved surface and a second curved surface. The second lens element is a positive (Continued)

meniscus lens element including a third curved surface and a fourth curved surface. The third lens element is a positive meniscus lens element including a fifth curved surface and a sixth curved surface. The fourth lens element is a plane lens adapted to play a role in protecting other lens elements. The first to third lens elements are arranged around a same axis along the propagation direction of the incident ray. The first to sixth curved surfaces are arranged sequentially along the propagation direction of the incident ray. The above Fθ lens for infrared large-format telecentric laser marking can be used as an Fθ lens for infrared laser marking, which can meet the telecentric requirement of the large-format laser marking, and control the volume of the lens within an acceptable and applicable range, to achieve miniaturizing of the whole optical system.

9 Claims, 2 Drawing Sheets

(51) Int. Cl.
　　　*G02B 9/34*　　　(2006.01)
　　　*G02B 13/14*　　(2006.01)
　　　*G02B 13/22*　　(2006.01)
　　　*G02B 27/00*　　(2006.01)
(52) U.S. Cl.
　　　CPC ......... *G02B 13/22* (2013.01); *G02B 27/0025* (2013.01)

(56) References Cited

U.S. PATENT DOCUMENTS

| | | |
|---|---|---|
| 8,331,043 B2 | 12/2012 | Li |
| 2006/0268424 A1 | 11/2006 | Miyano |
| 2013/0279027 A1* | 10/2013 | Wunderlich ....... G02B 13/0005 359/756 |

FOREIGN PATENT DOCUMENTS

| | | |
|---|---|---|
| CN | 101487923 A | 7/2009 |
| CN | 101846790 A | 9/2010 |
| CN | 101866043 A | 10/2010 |
| CN | 101881875 A | 11/2010 |
| DE | 20 2013 009 184 U1 | 12/2013 |
| JP | S61286810 A | 12/1986 |
| JP | S62254110 A | 11/1987 |
| JP | S63204213 A | 8/1988 |
| JP | 2007-309971 A | 11/2007 |

OTHER PUBLICATIONS

Office Action dated Jun. 8, 2017 issued in corresponding German Patent Application No. 11 2013 007 354.4.
International Search Report, PCT/CN2013/082064.

* cited by examiner

INFRARED LARGE-FORMAT TELECENTRIC LASER MARKING F THETA LENS

CROSS REFERENCE TO RELATED APPLICATIONS

This application is a national stage application (under 35 U.S.C. § 371) of PCT/CN2013/082064, filed Aug. 22, 2013, the contents of which are incorporated herein by reference in its entirety.

FIELD

The present invention relates to the field of optical lens, and more particularly, to an Fθ lens for infrared large-format telecentric laser marking.

BACKGROUND

Telecentric technology refers to an optical design in which the exit pupil position is disposed at an infinite point to ensure that the chief ray of the optical system of the Fθ lens is parallel to the optical axis. That is, all rays focused at the focal point on the image surface have the same aperture angle, and an image of an object of substantially fixed size can be obtained on the image surface. Since it is required that all the exit pupil chief rays must be parallel to each other, the lens is required to have a larger optical aperture when the image has a larger format; that is, the larger the format, the larger the lens is. The volume of the lens is proportional to the optical aperture D or $D^3$, so the Fθ lens of large format is rarely applied in practice.

For a conventional telecentric system, the entrance pupil position is always disposed at the front focus of the system to allow the chief ray of the focused ray to be perpendicular to the focal plane. When the lens has a long focal length, the entrance pupil position is at a distant point due to the far distance of the focal point. This not only increases the whole volume of the optical system of the Fθ lens, but also increases the difficulty of correcting the aberrations of the optical system of the Fθ lens.

SUMMARY

Based on above, there is a need to provide an Fθ lens for infrared large-format telecentric laser marking, which can control the volume of the lens within an acceptable and applicable range whilst reducing the difficulty of correcting the aberrations.

An Fθ lens for infrared large-format telecentric laser marking, including:

a first lens element, which is a negative biconcave lens element, including a first curved surface protruding outward to an image side, and a second curved surface protruding outward to an object side;

a second lens element, which is a positive meniscus lens element, including a third curved surface and a fourth curved surface both protruding outward to the image side;

a third lens element, which is a positive meniscus lens element, including a fifth curved surface protruding outward to the object side, and a sixth curved surface which is a flat plane;

wherein the first to third lens elements are arranged sequentially around a same axis along the propagation direction of an incident ray, and the first to sixth curved surfaces are arranged sequentially along the propagation direction of the incident ray;

wherein center thicknesses of the first to third lens elements are 6 mm, 16 mm and 12 mm respectively, with an allowable tolerance of 10%, an upper variation of tolerance of +5%, and lower variation of tolerance of −5%; and wherein radiuses of curvature of the first to fifth curved surfaces are −143 mm, 330 mm, −1100 mm, −160 mm and 320 mm respectively, with an allowable tolerance of 10%, an upper variation of tolerance of +5%, and lower variation of tolerance of −5%.

In one embodiment, center-to-center distances between the second curved surface and the third curved surface, and between the fourth curved surface and the fifth curved surface are 76 mm and 0.5 mm respectively, with an allowable tolerance of 10%, an upper variation of tolerance of +5%, and lower variation of tolerance of −5%.

In one embodiment, the first to third lens elements are rotationally symmetrical around the axis of the incident ray, that is, each of the first to third lens elements has a projection in a circular shape on a plane perpendicular to the incident ray.

In one embodiment, each of the first to fifth curved surfaces is a spherical surface.

In one embodiment, the Fθ lens for infrared large-format telecentric laser marking further includes a fourth lens element, which is a plane lens element, including a seventh curved surface and an eighth curved surface both of which are flat planes. The fourth lens element is arranged on a side of the third lens element adjacent to an image, adapted to play a role in protecting other lens elements.

In one embodiment, the fourth lens has a thickness of 4 mm, with an allowable tolerance of 10%, an upper variation of tolerance of +5%, and lower variation of tolerance of −5%.

In one embodiment, the seventh curved surface is adjacent to the sixth curved surface, and a center-to-center distance between the seventh curved surface and the sixth curved surface is 4 mm, with an allowable tolerance of 10%, an upper variation of tolerance of +5%, and lower variation of tolerance of −5%.

In one embodiment, the Fθ lens for infrared large-format telecentric laser marking has a working distance of 370 mm.

In one embodiment, the Fθ lens for infrared large-format telecentric laser marking has a working ray from an infrared laser.

The above Fθ lens for infrared large-format telecentric laser marking can be used as an Fθ lens for infrared laser marking, which can firstly meet the telecentric requirement of the large-format laser marking, and reduce the entrance pupil and system distances significantly with a structure of a retrofocus system, so that the structure of system is greatly simplified to control the volume of the lens within an acceptable and applicable range to achieve miniaturizing of the whole optical system, with a higher capacity of aberration correction.

DETAILED DESCRIPTION OF THE PREFERRED EMBODIMENTS

Figure 1:
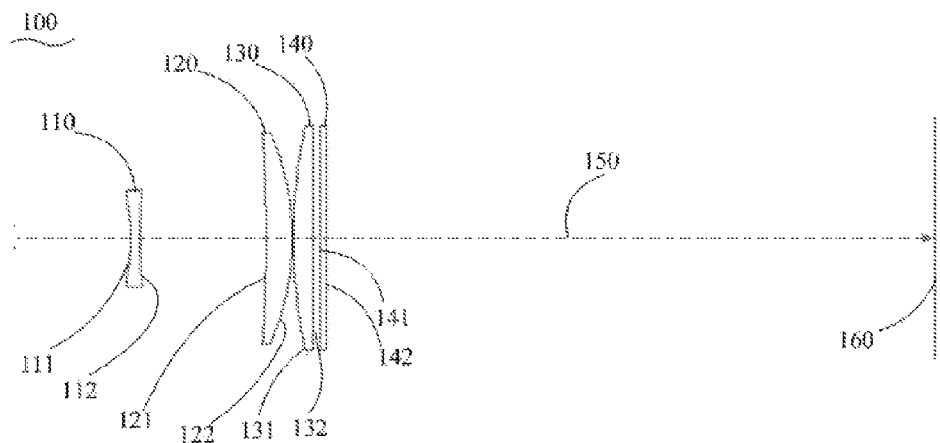
FIG. 1 is a structural schematic diagram of an Fθ lens for infrared large-format telecentric laser marking according to an embodiment of the present invention.

These and other features of the Fθ lens for infrared large-format telecentric laser marking according to the present invention will be apparent from reading the following description provided by way of non-limiting example, with reference to the figures illustrated in the attached drawings. The drawings provide preferred embodiments of the present invention. Various implements of the present invention may, however, be embodied in many different forms and should not be construed as limited to the embodiments set forth herein. Rather, these embodiments are provided to enable better and comprehensive understanding of the invention of the present invention.

It's important to note that the negative sign used herein means the ray propagates from left to right. Taking the intersection point of the spherical surface and the principal optical axis as a reference point, if the center of the spherical surface is in the left of the intersection point, the radius of curvature has a negative value, if, on the other hand, the center of the spherical surface is in the right of the intersection point, the radius of curvature has a positive value. In addition, in view of the ray propagating from left to right, one side on the left of the lens is referred as the object side, and the other side on the right of the lens is referred as the image side.

Unless otherwise specified, all terminologies and scientific terms used herein have the same meaning as normal sense understood by a technical person belonging to the technical field of the present invention. The terms used herein is for the purpose of describing particular embodiments only and is not intended to be limiting of the present invention. As used herein, the term "and/or" includes any and all combinations of one or more of the associated listed items and may be abbreviated as "/".

As shown in HG. 1, in the embodiment, the Fθ lens for infrared large-format telecentric laser marking 100 includes four lens elements arranged sequentially along the propagation direction of an incident ray 150, including a first lens element 110, a second lens element 120, a third lens element 130 and a fourth lens element 140. The first to third lens elements 110, 120, 130 are arranged around a same axis along the propagation direction of the incident ray 150.

The first lens element 110 is a negative biconcave lens element, including a first curved surface 111 and a second curved surface 112. The first curved surface 111 is a spherical surface protruding outward to an image side. The second curved surface 112 is a spherical surface protruding outward to an object side. The radius of curvature of the first curved surface 111 is −143±5% mm. The radius of curvature of the second curved surface 112 is −330±5% mm. The first lens element 110 has a thickness of 6±5% mm along the optical axis.

The second lens element 120 is a positive meniscus lens element, including a third curved surface 121 and a fourth curved surface 122. Each of the third and fourth curved surfaces is a spherical surface protruding outward to the image side. The radius of curvature of the third curved surface 121 is −1,100±5% mm. The radius of curvature of the fourth curved surface 122 is −160±5% mm. The second lens element 120 has a thickness of 16±5% mm along the optical axis. The distance between the second lens element 120 and the first lens element 110, that is, the distance between the third curved surface 121 and the second curved surface 112 in the optical axis is preferably 76±5% mm.

The third lens element 130 is a positive meniscus lens element, including a fifth curved surface 131 and a sixth curved surface 132. The fifth curved surface 131 is a spherical surface protruding outward to the object side. The sixth curved surface 132 is a flat plane. The radius of curvature of the fifth curved surface 131 is 320±5% mm. The third lens element 130 has a thickness of 12±5% mm along the optical axis. The distance between the third lens element 130 and the second lens element 120, that is, the distance between the fifth curved surface 131 and the fourth curved surface 122 in the optical axis is preferably 0.5±5% mm.

The first to sixth curved surfaces 111, 112, 121, 122, 131, 132 are arranged sequentially along the propagation direction of the incident ray 150. The incident ray 150 passes through the first to sixth curved surfaces 111, 112, 121, 122, 131, 132, and an image of the object of substantially fixed size can be obtained on the image surface 160.

In the embodiment, the first to third lens elements 110, 120, 130 are rotationally symmetrical around the axis of the incident ray, that is, each of the first to third lens elements 110, 120, 130 has a projection in a circular shape on a plane perpendicular to the incident ray 150. In other embodiments, the first to third lens elements 110, 120, 130 may be not rotationally symmetrical, that is, each of the first to third lens elements 110, 120, 130 has a projection in an elliptical shape, a square shape or any other appropriate shape on a plane perpendicular to the incident ray 150.

The fourth lens element 140 is a plane lens element includes a seventh curved surface 141 and a eighth curved surface 142. Each of the seventh and eighth curved surfaces 141, 142 is a flat plane. The fourth lens element 140 is arranged on a side of the third lens element 130 adjacent to the image, adapted to play a role in protecting other lens elements. In other embodiments, the fourth lens element 140 may be arranged on a side of the third lens element 130 adjacent to the object, or arranged between two lens elements. The fourth lens element 140 has a thickness of 4±5% mm. The distance between the fourth lens element 140 and the third lens element 130, that is, the distance between the seventh curved surface 141 and the sixth curved surface 132 in the optical axis is preferably 4±5% mm. It can be understood that the fourth lens element 140 may be omitted.

The above Fθ lens for infrared large-format telecentric laser marking has a working distance of 370 mm.

The above Fθ lens for infrared large-format telecentric laser marking has a working ray of from infrared laser.

Figure 2:
FIG. 2 is a schematic diagram illustrating dispersion of a focus point of the Fθ lens for infrared large-format telecentric laser marking of FIG. 1.
Figure 2:
Figure 3:
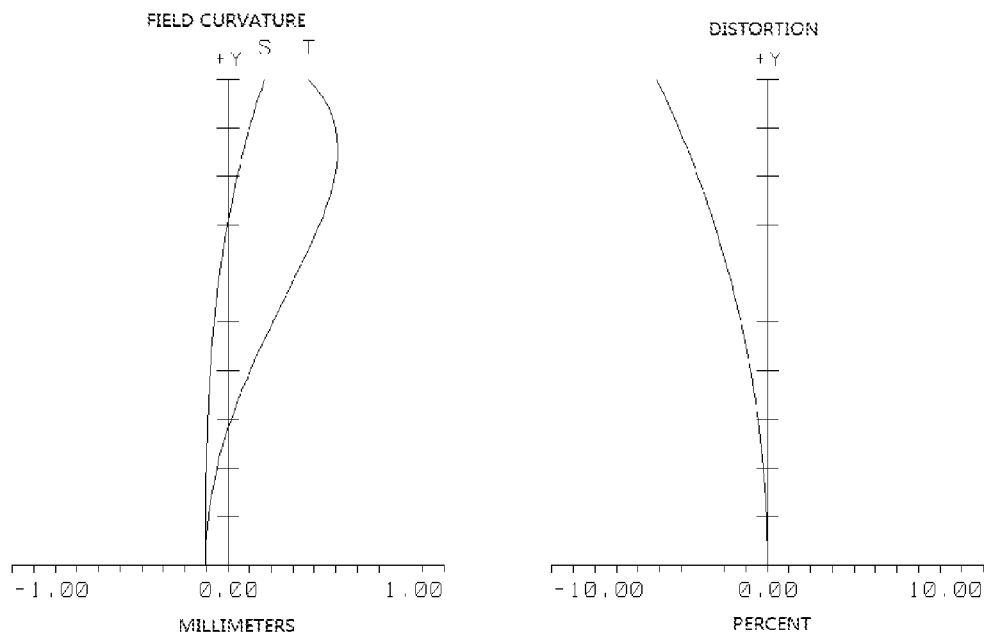
FIG. 3 is a graph illustrating astigmatism and distortion of the Fθ lens for infrared large-format telecentric laser marking of FIG. 1.
Figure 4:
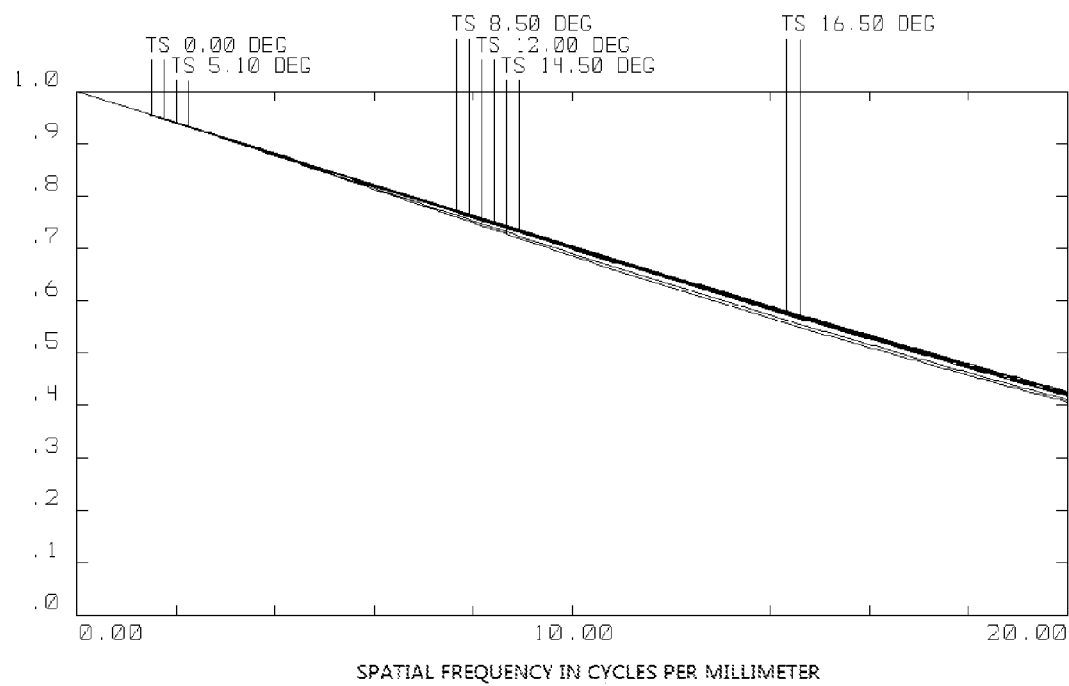
FIG. 4 is a graph illustrating a modulation transfer function (MTF) of the Fθ lens for infrared large-format telecentric laser marking of FIG. 1.

FIG. 2 is a schematic diagram illustrating dispersion of a focus point of the above Fθ lens for infrared large-format telecentric laser marking, which shows that the reference line of the size of the defocused spots in different fields of view respectively is 40 μm, the units on the X-axis are in micrometers, and the Y-axis represents the distance from the center of the lens to the edge in the meridian direction. FIG. 3 is a graph illustrating astigmatism and distortion of the above Fθ lens for infrared large-format telecentric laser marking, in which both the astigmatism and distortion curves reach or lower than theoretical value or theoretical level, meaning that the Fθ lens for infrared large-format telecentric laser marking has a higher capacity of aberration correction. FIG. 4 is a graph illustrating a modulation transfer function (MTF) of the above Fθ lens for infrared large-format telecentric laser marking, in which the M.T.F is still 0.42 when the resolution reaches 20 line pairs/mm, meaning that the Fθ lens for infrared large-format telecentric laser marking has a higher imaging quality.

The above Fθ lens for infrared large-format telecentric laser marking can be used as an Fθ lens for infrared laser marking, which can firstly meet the telecentric requirement of the large-format laser marking, and reduce the entrance pupil and system distances significantly with a structure of a retrofocus system, so that the structure of system is greatly simplified to control the volume of the lens within an acceptable and applicable range to achieve miniaturizing of the whole optical system, with a higher capacity of aberration correction.

The above are preferred embodiments of the present invention described in detail, and should not be deemed as limitations to the scope of the present invention. It should be noted that variations and improvements will become apparent to those skilled in the art to which the present invention pertains without departing from its spirit and scope. Therefore, the scope of the present invention is defined by the appended claims.

What is claimed is:

1. An Fθ lens for infrared large-format telecentric laser marking, comprising:
    a first lens element, which is a negative biconcave lens element, including a first curved surface protruding outward to an image side, and a second curved surface protruding outward to an object side;
    a second lens element, which is a positive meniscus lens element, including a third curved surface and a fourth curved surface both protruding outward to the image side;
    a third lens element, which is a positive meniscus lens element, including a fifth curved surface protruding outward to the object side, and a sixth curved surface which is a flat plane;
    wherein the first to third lens elements are arranged sequentially around a same axis along the propagation direction of an incident ray, and the first to sixth curved surfaces are arranged sequentially along the propagation direction of the incident ray;
    wherein center thicknesses of the first to third lens elements are 6 mm, 16 mm and 12 mm respectively, with an allowable tolerance of 10%, an upper variation of tolerance of +5%, and lower variation of tolerance of −5%; and
    wherein radiuses of curvature of the first to fifth curved surfaces are −143 mm, 330 mm, −1100 mm, −160 mm and 320 mm respectively, with an allowable tolerance of 10%, an upper variation of tolerance of +5%, and lower variation of tolerance of −5%.

2. The Fθ lens for infrared large-format telecentric laser marking of claim 1, wherein center-to-center distances between the second curved surface and the third curved surface, and between the fourth curved surface and the fifth curved surface are 76 mm and 0.5 mm respectively, with an allowable tolerance of 10%, an upper variation of tolerance of +5%, and lower variation of tolerance of −5%.

3. The Fθ lens for infrared large-format telecentric laser marking of claim 1, wherein the first to third lens elements are rotationally symmetrical around the axis of the incident ray.

4. The Fθ lens for infrared large-format telecentric laser marking of claim 1, wherein each of the first to fifth curved surfaces is a spherical surface.

5. The Fθ lens for infrared large-format telecentric laser marking of claim 1, further comprising a fourth lens element, the fourth lens element being a plane lens element arranged on a side of the third lens element adjacent to an image and including a seventh curved surface and an eighth curved surface both of which are flat planes.

6. The Fθ lens for infrared large-format telecentric laser marking of claim 5, wherein the fourth lens has a thickness of 4 mm, with an allowable tolerance of 10%, an upper variation of tolerance of +5%, and lower variation of tolerance of −5%.

7. The Fθ lens for infrared large-format telecentric laser marking of claim 5, wherein the seventh curved surface is adjacent to the sixth curved surface, and a center-to-center distance between the seventh curved surface and the sixth curved surface is 4 mm, with an allowable tolerance of 10%, an upper variation of tolerance of +5%, and lower variation of tolerance of −5%.

8. The Fθ lens for infrared large-format telecentric laser marking of claim 1, wherein the Fθ lens for infrared large-format telecentric laser marking has a front working distance of 370 mm.

9. The Fθ lens for infrared large-format telecentric laser marking of claim 1, wherein the Fθ lens for infrared large-format telecentric laser marking has a working ray from an infrared laser.

* * * * *